(12) United States Patent
Vonolfen et al.

(10) Patent No.: US 11,997,410 B2
(45) Date of Patent: May 28, 2024

(54) METHOD FOR TRANSFERRING AT LEAST ONE IMAGE CONTENT TO AT LEAST ONE VIEWER

(71) Applicant: Fraunhofer-Gesellschaft Zur Forderung Der Angewandten Forschung E.V., Munich (DE)

(72) Inventors: Wolfgang Vonolfen, Sankt Augustin (DE); Stefan Eickeler, Sankt Augustin (DE); Peter Isajczuk, Sankt Augustin (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 17/787,401

(22) PCT Filed: Dec. 18, 2020

(86) PCT No.: PCT/EP2020/087299
§ 371 (c)(1),
(2) Date: Nov. 16, 2022

(87) PCT Pub. No.: WO2021/123365
PCT Pub. Date: Jun. 24, 2021

(65) Prior Publication Data
US 2023/0070449 A1 Mar. 9, 2023

(30) Foreign Application Priority Data
Dec. 19, 2019 (DE) .......................... 102019220278.0

(51) Int. Cl.
*H04N 5/262* (2006.01)
*H04N 5/268* (2006.01)

(52) U.S. Cl.
CPC ........... *H04N 5/268* (2013.01); *H04N 5/2625* (2013.01)

(58) Field of Classification Search
CPC ..... H04N 5/268; H04N 5/2621; H04N 5/2625
See application file for complete search history.

(56) References Cited

U.S. PATENT DOCUMENTS

| | | | | |
|---|---|---|---|---|
| 5,293,231 A * | 3/1994 | Elberbaum | ............... | H04N 5/04 348/521 |
| 7,064,778 B1 * | 6/2006 | Waehner | .................. | H04N 5/76 348/E5.057 |

(Continued)

FOREIGN PATENT DOCUMENTS

WO 2018138366 A1 8/2018

OTHER PUBLICATIONS

PCT International Search Report and Written Opinion (PCT/EP2020/087299).

*Primary Examiner* — Brian P Yenke
(74) *Attorney, Agent, or Firm* — Marshall & Melhorn, LLC (57) ABSTRACT

A method for transmitting at least one image content to at least one viewer. The image contents in the method may be represented by a plurality of individual images. The method may also have a display periodically showing the plurality of individual images one after the other, and a camera outputting a plurality of pictures of a scenery at least partially containing the display. The camera outputting at least one of the shown individual images for each picture and the individual images of at least one of the image contents being transmitted to at least one viewer.

30 Claims, 1 Drawing Sheet

(56) References Cited

U.S. PATENT DOCUMENTS

| | | | |
|---|---|---|---|
| 7,486,308 B1* | 2/2009 | Kori | H04L 12/40071 |
| | | | 386/231 |
| 9,355,325 B2* | 5/2016 | Vonolfen | H04N 5/2224 |
| 10,110,822 B2* | 10/2018 | Vonolfen | H04N 5/145 |
| 10,412,322 B2* | 9/2019 | Eickeler | G06T 7/90 |
| 10,785,455 B2* | 9/2020 | Saito | H04N 5/04 |
| 11,206,442 B2* | 12/2021 | Hui | H04N 21/274 |
| 11,336,813 B2* | 5/2022 | Braun | H04N 23/60 |
| 11,457,252 B2* | 9/2022 | Von Braun | H04N 21/8456 |
| 11,490,137 B2* | 11/2022 | Braun | H04N 21/23439 |
| 2004/0252230 A1* | 12/2004 | Winder | G06T 5/002 |
| | | | 348/E7.071 |
| 2007/0008416 A1* | 1/2007 | Kim | H04N 23/90 |
| | | | 348/E7.086 |
| 2009/0102957 A1 | 4/2009 | Phelan | |
| 2013/0070064 A1* | 3/2013 | Bickerstaff | H04N 13/122 |
| | | | 348/E13.001 |
| 2014/0118591 A1* | 5/2014 | Maglaque | H04N 23/55 |
| | | | 348/308 |
| 2015/0009184 A1* | 1/2015 | Baker | H04N 21/4622 |
| | | | 345/175 |
| 2016/0031370 A1* | 2/2016 | McElroy | B60R 1/00 |
| | | | 348/148 |
| 2016/0255283 A1 | 9/2016 | Vonolfen | |
| 2018/0020167 A1* | 1/2018 | Hammond | H04N 9/75 |
| 2019/0014237 A1* | 1/2019 | Takahashi | H04W 56/00 |
| 2022/0351751 A1* | 11/2022 | Ocean | G11B 27/031 |

* cited by examiner

METHOD FOR TRANSFERRING AT LEAST ONE IMAGE CONTENT TO AT LEAST ONE VIEWER

BACKGROUND

The invention relates to a method for transmitting at least one image content to at least one viewer, image contents being represented by a plurality of individual images, a display periodically showing the plurality of individual images one after the other, and a camera outputting a plurality of pictures of a scenery at least partially containing the display, the camera outputting at least one of the shown individual images for each picture and the individual images of at least one of the image contents being transmitted to at least one viewer.

SUMMARY

The invention is based on a situation in which a camera takes pictures of a scenery that contains a display for presenting image contents. A typical example of such situations are sports events in which there are displays in the stadium, for example, for advertising, and which are recorded and transmitted with television cameras. The television cameras record the displays, for example, perimeter advertising boards on a soccer field, and transmit the content shown on the displays with the television picture. It is desirable if other image contents of said displays can be transmitted in the images recorded by the camera, than what a local spectator perceives on site. In this way, the local spectator can see image contents that are relevant to him, while at the same time, a television viewer can see other image contents that are relevant to the television viewer.

One approach to presenting a viewer of the images recorded by the camera with image contents different from that perceived by an immediate viewer of the display is to alternately present the different image contents in quick succession on the display and to synchronize the camera with the presentation on the display such that the camera only records one of the image contents. The problem here, however, is that the image contents intended for the television viewer must be presented by the display such that the immediate viewer of the display on site perceives said additional display contents as little as possible.

The object of the present invention is to specify a method for transmitting at least one image content to at least one viewer, the method allowing to present different image contents to the viewer of images recorded by the camera than to an immediate viewer, in which the perception for the immediate viewer is affected as little as possible.

Embodiments of the invention also make it possible to set motion blur well for the viewer of the images recorded by the camera. Further embodiments make it possible to keep a flicker effect low for immediate viewers of the display. In addition, advantageous embodiments of the invention allow photographers of the display to record the image content visible to the immediate viewer on site with the greatest possible probability.

The object is achieved by the method for transmitting at least one image content to at least one viewer according to claim 1 and by the device for transmitting at least one image content to at least one viewer according to claim 31. The dependent claims specify advantageous developments of the method according to claim 1.

The invention relates to a method for transmitting at least one image content to at least one viewer. Image content can be understood here as content presented by one or more images that follow one another in time, for example, a video or a still image that is shown over a specific period of time. An image content is thus represented by one or more individual images, which can change over time in the case of a video, for example, or can also be temporarily or continually constant, such as in the case of a still image or a section of a video that is static for a certain period of time. Each of the individual images preferably represents exactly one of the image contents, so that no single image represents a plurality of the image contents at the same time. An image content is thus understood to mean the complete content of all the individual images belonging to the corresponding image content.

According to the invention, a display is provided which periodically displays the plurality of individual images one after the other. The individual images are thus shown in chronological order by the display. In this case, the display takes place periodically, which means that the order in which the individual images of the different image contents are shown is repeated periodically. It should be pointed out that the individual images themselves do not have to be repeated, rather, the chronological sequence of their association with the at least two image contents is repeated.

According to the invention, it is also provided that the display shows a plurality of individual images of at least one of the image contents within a respective display period and/or presents one of the image contents longer in time than at least one other of the image contents within a respective display period. Longer in time means that the total time that said image content is presented in each period is longer for one of the image contents than for at least one other, the total time not having to be contiguous, but being able to be contiguous. Thus, at least within a time interval in each period, a plurality of individual images of at least one of the image contents are presented by the display. On the one hand, this means that for an immediate viewer of the display, the image content from which a plurality of individual images are presented can be highlighted, and on the other hand, this increases the probability that a photograph of the display taken by a photographer on site records said image content.

According to the invention, a camera is provided which outputs a plurality of pictures of a scenery which at least partially contains the display. Of course, the scenery can also contain the display completely. The scenery here is the area that is depicted by images output by the camera. An example of such a scenery would be a sports stadium in which an LED board acts as a display.

The focus here is on which images the camera outputs, since this is more relevant to the method according to the invention than the question of what the camera records. What the camera records depends on the camera technology. However, for the viewer to whom the at least one image content is to be transmitted, only what is output by the camera is of importance.

According to the invention, a picture timing, which is the chronological sequence of the pictures output by the camera, is synchronized with an individual image timing, which is the chronological sequence with which the display shows the individual images, so that the camera outputs at least one of the individual images shown by the display for each recording that it outputs. A timing is thus generally understood to mean a chronological sequence. Since the individual image display is periodic, the picture timing will usually also be periodic. The picture timing is understood to mean the chronological sequence of those times at which the pictures depict the scenery. The times that give the picture timing are therefore times at which light from the scenery entered the camera. Since a camera image is usually created with a specific exposure time, the picture timing is composed of those time intervals in which light has entered the camera to create the corresponding pictures. In the picture timing, said exposure times or picture intervals have a specific time location, that is, a starting or ending point in time and a specific duration. The picture timing should be distinguished from the times at which the camera outputs the pictures.

Since the picture timing determines the points in time and time intervals at which light entering the camera is taken into account for the corresponding pictures, said picture timing can be coordinated with the individual image timing such that each picture contains at least one of the individual images.

According to the invention, the individual images of at least one of the image contents are then transmitted to at least one of the at least one viewer. Normally, said image content can be transmitted to a plurality of viewers, such as television viewers.

Transmission is to be understood here as meaning any type of transmission to the viewer(s), wherein it is advantageous, but not essential, for the viewer to also show the image content. The viewer can also record or save the image content, even without showing it.

In an optional embodiment of the invention, the camera can output all of the individual images shown by the display. It is particularly advantageous here if the camera outputs the combination or sum of some or all of the individual images. In particular, the camera can output said sum as exactly one picture in each case. For this purpose, the individual images shown by the display can advantageously be designed such that the combination of individual images and in particular the sum of the individual images, results only in that image content that is to be transmitted to the viewer. All other image contents can be configured in the individual images such that they cancel out or erase each other when they are combined and, in particular, when they are summed.

In a further advantageous embodiment of the invention, the picture timing can be synchronized with the individual image timing such that the camera outputs exactly one of the individual images shown by the display for each picture. This makes it possible to show the image content that is to be transmitted to the viewer on the display with only one individual image per display period, which means that said image content can recede into the background for a direct viewer of the display on site and, ideally, is not perceptible at all. This applies in particular when the image content that should be recognizable to the direct viewer is presented with a plurality of individual images per period.

The individual images that are shown by the display are preferably designed such that an immediate viewer of the display perceives exactly one of the image contents. This can be achieved in particular in that the individual images are designed such that the individual images shown by the display complement each other to form exactly one image content that is perceived by the immediate viewer of the display. Advantageously, said complementing can be completed within a period. However, it is also possible that one of the image contents is designed such that it neutralizes itself for the direct viewer over a plurality of periods, for example, if said image content alternately shows a certain pattern and an inverse of the pattern in successive periods, which neutralizes the pattern for the immediate viewer.

In a particularly preferred embodiment of the invention, a first of the image contents can have a color correction of a second of the image contents, which is designed such that an immediate viewer of the display perceives the first image content without a color change compared to the original first image content. This can be achieved, for example, by adding the color correction to the first image content by adding an inverse of the individual images of the second image content in the corresponding display period to the individual images of the first image content of said period. This addition preferably takes place pixel by pixel. However, this is only to be understood as an example. Various options are shown below for how the individual images can be designed in order to make only the first image content recognizable to an immediate viewer of the display.

In general, the individual images presented by the display per display period can firstly contain first individual images that represent a first image content, secondly second individual images that represent a second image content and thirdly third individual images that cause color compensation of the second individual images for a direct viewer of the display. In this case, the first, second and third individual images are preferably not the same individual images. In this embodiment, an immediate viewer of the display can only see those individual images which present the first image content, while the second individual images are neutralized with the third individual images. The picture timing can then preferably be synchronized with the individual image timing such that the camera outputs the second individual images, but not the first individual images and not the third individual images.

In this embodiment of the invention, it is particularly advantageous if the display shows the third individual images divided into at least two groups, the at least two groups being spaced apart from one another by at least one or more of the first and/or second individual images. If the third individual images are divided into at least two groups, the duration for which the same image content is presented uninterruptedly within each period is reduced and the number of content changes is increased. The flicker effect is reduced by increasing the alternating frequency within a period. The flicker effect occurs primarily in the lateral field of vision of the human eye, since there, with just a few receptors, one hardly perceives image resolution and mainly movement. The opposite is true in the central field of vision. The predominant influence for the flicker effect is the image brightness and less the coloring of the image. In particular, this is due to the comparatively small number of color receptors compared to brightness receptors on the retina of the eye. Studies have shown that even a color change every 10 ms is imperceptible. On the other hand, differences in brightness are still perceptible, even if the brightness jumps in only 2 ms from 20 ms.

The present invention is applicable to all formats for displaying and capturing image contents, in particular to all television formats. Said formats can have different frequencies with which they present or record images. Typical refresh rates are 50 Hz and 60 Hz, for example. Different refresh rates lead to different durations of the individual images or frames. The duration of an image or frame is equal to 1 divided by the refresh rate. For example, a refresh rate of 50 Hz results in an image duration of 20 ms and a refresh rate of 60 Hz results in an image duration of 16.66 ms. Advantageously, said durations of an image or frame may be the length of the display period in the present invention. Within the scope of this document, the generalized unit "ze" is to be used as the unit of time. 1 ze is defined as the duration of the display period divided by i, where i is a number greater than or equal to 2. Preferably i is greater than or equal to 8 or greater than or equal to 10. Particularly preferably, i=20 or i=16.6. In an implementation of the invention with a refresh rate of 50 Hz with i=20, 1 ze would be =1 ms. At a refresh rate of 60 Hz with i=20, 1 ze would be =0.83 ms. The unit ze can correspondingly be defined for all other refresh rates. Alternatively, the unit ze can also be defined such that 1 ze=1 ms in systems having a refresh rate of 60 Hz. In this case, 1 ze can thus equal the display period divided by i=16.6. In both 50 Hz and 60 Hz systems, ze can also be obtained by dividing the display period by other values i such as 10, 8.3, 40 or 33.2. These can optionally be chosen such that 1 ze=1 ms or an integer multiple of 1 ms or 1 ms divided by an integer.

In an advantageous embodiment of the invention, the display can show within each display period a first of the image contents for a first duration, referred to here as t151, and then show a second of the image contents for a duration equal to the total duration of the display period minus the first duration t151, which is color corrected to compensate for the first of the image contents. It is preferred in this case if the first duration t151 is shorter than the duration of the display period minus t151. The shorter the first duration, the fewer the individual images of the second image content have to be changed for color correction. A typical example could be that within each display period, an individual image of the first image content is initially shown for 2 ze, then at least one individual image of the second image content for 8 ze, then, for example, at least one individual image of an inverse of the first image content for 2 ze and then, for example, at least one individual image of the second image content for 8 ze. The combination of the individual images of the second image content with the at least one individual image of the inverse of the first image content serves as the second image content, which is color-corrected to compensate for the first image content. The fact that the inverse of the first image content is shown here in the color-corrected second image content between individual images of the actual second image content is advantageous since the flicker effect can be reduced as a result. However, it is also possible to show the inverse before or after the individual images of the second image content or to divide the second image content into still more than two groups.

The duration with which each individual image is presented can be the same for all individual images. A longer presentation of one of the image contents can then be achieved by showing a plurality of said individual images of the same length in immediate succession. The duration of said individual images of the same length can be, for example, the shortest duration with which one of the image contents is shown without interruption. However, it is also possible for the individual images to have different durations. In particular, it is possible for the respective image contents to be presented uninterruptedly by the individual images being presented for the duration for which the corresponding image content is presented uninterruptedly.

In an advantageous embodiment of the invention, the display can show within each display period, initially for a first duration t181, individual images of the first of the image contents, then, for the same duration t181, individual images of an inverse of the first of the image contents, and then for the remainder of the display period, that is, for a duration equal to the duration of the display period minus twice t181, one or more individual images of a second of the image contents. For example, if the period duration is 20 ze and t181 equals 2 ze, the second image content is shown for 16 ze in this example.

In this case, the picture timing of the camera is preferably synchronized with the display of the individual images, that is, the individual image timing, so that the camera only outputs the first individual images of the first of the image contents, that is, those individual images that are shown during the first duration t181 within a respective display period, but not the individual images of the inverse of the first of the image contents, and preferably also not the individual images of the second image content. This embodiment is particularly advantageous for camera types which, unlike a slow-motion camera, cannot output individual images and the overall image at the same time, but which have higher scanning frequencies and, at the same time, variable shutters. In this embodiment of the invention, the shutter of the camera can be operated asynchronously and set to the first occurrence of duration t181 and to the time when the second image content is shown within a respective display period. This is advantageous since a photographer photographing the display on location has a high probability of capturing content with the correct color. In addition, the motion blur is retained for at least one of the two image contents.

In an advantageous embodiment of the invention, the display can show within each period first individual images of the first of the image contents for a first duration t191, then individual images of an inverse of the first image contents for the same duration t191, then individual images of the second of the image contents for a second duration t192, then for a duration t193 individual images of the second of the image contents, the common luminance of which is adjusted to the common luminance of the individual images of the first image contents, and then again individual images of the second of the image contents for a duration t192. In this case, for example, t191=2 ze, t192=6 ze and t193=4 ze. This embodiment is advantageous, in particular when it is assumed that the first image content has a different luminance than the second image content. The sequence described results in a frequency doubling for the change in luminance compared to the previously described embodiment. This can reduce the flicker effect. In this embodiment, a direct photographer of the display obtains satisfactory images during the first duration t191, and during the duration t193 and the last duration t192.

A further advantageous embodiment of the invention allows, within each period, to first show individual images of a first of the image contents for a duration t111, then to show individual images of an inverse of the first image content for the same duration t111, then to show individual images of a second of the image contents for a duration t112, then to show for a duration t113 individual images of the second image content, the luminance of which is adjusted, then to show individual images of the second image content again for a duration of t112, then to show again for a duration t113 individual images of the second image content, the luminance of which is adapted and then to show individual images of the second image content again for a duration t112. The luminance of the individual images of the second image content can be adapted such that the luminance of all individual images, the luminance of which is adapted, is equal to a common luminance of all individual images of the first image content. Said luminance adjustment can reduce the flicker effect since the flicker effect is caused by changes in luminance. The camera can then output exactly those individual images of the first image content that are shown during the first duration t111 and the individual images of the second image content shown during a preferably second occurrence of the duration t112, but preferably not the other individual images. In this embodiment, for example, t111=2 ze, t112=4 ze and t113=2 ze.

In an asynchronous scan, the camera could output the first image content for duration t111, then be blind, for example, for a duration of t111, then record the second image content, or any part thereof, for the remainder of the period duration of the display period. Advantageously, the picture of the second image content can be as long as possible in order to be able to image as much motion blur as possible, but this is not necessary. A camera having a shutter could, for example, could record the first image content for a time of 2 ze and, after 10 ze, record the first 2 ze of the luminance-corrected second image content, which is shown for the time t112, for example, for 4 ze. In this embodiment, the most advantageous sequence would be the one described above.

It is advantageous if the picture timing is synchronized with the individual image timing such that the camera outputs the first image(s) of the first image contents or a part or all of the individual images of the second image contents, but not the individual images of the inverse of the first image contents and not the individual images of the second of the image contents with adapted luminance. In principle, however, it is also conceivable that one would also like to record the individual images of the second of the image contents with adapted luminance. This can happen if other criteria indicate otherwise (for example, if the display cannot technically present the required division and the camera is just as inflexible).

When using high-resolution cameras, technical limits may be reached due to the large amount of data. For example, currently available UHD cameras can only expose twice the set TV frequency (for example, 50 Hz) with a shutter of the same length, for example, with 2 ms every 10 ms. For such circumstances, the display can show a first of the image contents and a second of the image contents for a duration t201, for example, t201=2 ze, alternately separated by a time interval t202, for example, t202=10 ze, the picture timing of the camera thus being synchronized with the display timing so that the camera outputs pictures of durations t201 but not pictures from time intervals t202.

In an advantageous refinement of this specific embodiment, the display can show individual images of the first and/or the second image content during the time intervals t202. This increases the probability that a photograph taken directly from the display will show the corresponding image content. In addition, the motion blur is preserved.

In an advantageous embodiment, the display can show at least two individual images during the time intervals t202, the individual images containing an inverse of at least one image content shown during the durations t201, at least one individual image of a different image content being able to be shown between said individual images.

A particularly preferred embodiment of the invention provides that the display shows the image contents in the following order during each display period: For a duration of t201, a first A of the image contents, for a duration of t202, a second B of the image contents, for a duration of t201/2, an inverse A' of the image content A, for a duration of t203, the second B of the image contents, for a duration of t201/2, the inverse A' of the image content A, and for a duration t202, the second B of the image contents, it being particularly preferred that t201=2 ze, t202=7 ze, t203=2 ze. This embodiment represents an optimum in that it combines minimization of the flicker effect, color-correct exposure of contents for photographers who photograph the scenery on site, and a long exposure time for the second image content B to preserve motion blur.

In an optional embodiment of the invention, all individual images output by the camera can be transmitted to the viewer and shown thereto. In this way, simply by setting the picture timing, results in the viewer only perceiving one of the image contents.

However, it is also possible for individual images of different image contents recorded by the camera to be transmitted to different viewers. As a result, the display can show different image contents for different viewers who are not on site, and said different image contents can be selectively transmitted to the different viewers. For example, a billboard in a stadium could show advertisements for television viewers from different countries.

In an advantageous embodiment of the invention, a further camera can be provided, which can in particular be a video camera that outputs only part of the individual images shown per display period, said part of the individual images representing exactly one of the image contents. A picture timing in said further camera can be designed such that the further camera only records images or only outputs images recorded at those points in time at which the display shows individual images of the corresponding image content. This further camera does not have to be tuned to the individual images themselves and can be a normal slow camera. In this way, for example, a television broadcaster can record the scenery using its own cameras and can synchronize its cameras to the image content that is of interest to its audience.

In an advantageous embodiment of the invention, at least one of the image contents can have or consist of a pattern and an inverse of the pattern, the pattern and the inverse of the pattern particularly preferably being shown alternately in successive display periods. Said image content can then be used to recognize the display in the scenery recorded by the camera and, particularly preferably, to distinguish between the display and areas of the scenery that are not the display. This embodiment makes it possible for a viewer to overlay image contents in the moving image recorded by the camera where the display is recognized in the recorded moving image. This makes it possible to overlay different contents at the location of the display in the recorded moving image for a plurality of different groups of viewers, while the display itself only has to present two different image contents, namely that for the immediate viewer and that containing the pattern.

In an advantageous embodiment of the invention, the individual images recorded by the camera that belong to the same image content can be added up and/or interpolated according to content or intensity for each display period. In this way, it is possible to show the viewer to whom the individual images are transmitted motion blur which results from the fact that there is movement in the corresponding image content.

In general, it is advantageous if a plurality of individual images of different image contents are presented alternately within each display period, that is, each image content occurs at least twice in non-chronological succession within each display period. This can reduce the flicker effect.

The display can advantageously show a plurality of identical individual images within a respective display period of at least one of the image contents. This can increase the probability that an immediate photograph of the display, taken by an on-site photographer, for example, will show said image content undisturbed and with the correct exposure.

The invention can take special properties of the display into account. For example, Europe produces at a refresh rate of 50 Hz (20 ms per frame), while contents are typically displayed at 60 Hz on LED displays, since they are operated using commercially available computer monitor technology (transmission via DVI standard). It can be advantageous if the display and the camera are written with the same frequency. However, it is also possible to show a briefly shown content frame-synchronized for the camera. In this case, however, it is not necessary that the image content that has been shown for a long time, that is, that image content for which individual images may be shown over a longer duration than the other image content, also needs to be synchronized. It is also possible that the display continues to show at 60 Hz, while a briefly shown image content is faded in at a different frame rate synchronously with the recording camera. The invention also works in such an embodiment. The image contents can therefore be sent to the display at a first frame rate, which differs from a display frequency of the display but is the same as a recording frequency of the camera.

A display period can advantageously contain a different number of individual images for the different image contents. In particular, a display period can contain more individual images of one of the image contents than individual images of another of the image contents.

As already mentioned, fluctuations in luminance cause a flicker effect that is perceptible to the human eye. Advantageously, therefore, the luminance of the display of one of the image contents can briefly adjust the luminance to the level of the other image content. As a result, the change in luminance occurs within the higher frequency period without degrading the images for immediate photographs of the display or longer exposing cameras.

The invention can be further improved by suitably adjusting the luminance and thereby taking into account the respectively shown colors. In particular, it is advantageous to consider the luminance effect of individual colors separately. A magenta display in one of the image contents A can be color-compensated with green. Green and magenta have approximately the same luminance effect in the human eye. The situation is different with the combination of blue and yellow. The influence of blue on the luminance effect is very small (for example, only 10%), while that of yellow is close to white (100%). There are few flicker effects for two image contents A=magenta and B=green, and very strong flicker effects for image contents A=blue and B=yellow. A color balance for a blue image content can therefore only be done with dark yellow. A color distortion into blue would remain in this way. A complete color correction can then be carried out in the individual images of the other image content. The individual images are preferably subdivided into a plurality of sub-areas, which can in particular be pixels, a common luminance of corresponding sub-areas of the individual images of the first image content being equal to a common luminance of corresponding sub-areas of the individual images of the second image content. Corresponding sub-areas are those sub-areas that are shown at the same location on the display. This can minimize the flicker effect.

The camera used according to the invention can advantageously be a slow-motion camera that can output, for example, 100, 150, 300 or up to 400 pictures per second. Advantageously, the camera has such a recording frequency so that it can output an integral multiple of the individual images shown by the display per picture.

According to the invention, a device for transmitting at least one image content to at least one viewer is also specified, with which a method as described above can be carried out. This device contains at least one display with which a plurality of individual images can be shown periodically one after the other, wherein the display can show a plurality of individual images within a display period of at least one of the image contents and/or at least one of the image contents can be presented longer than the one or more other image contents. The device also contains a camera with which a plurality of pictures of a scenery that at least partially contains the display can be output. A picture timing, which is a chronological sequence of the pictures output by the camera, is synchronized with a individual image timing, with which the individual images can be shown by the display, such that the camera outputs at least one individual image shown by the display for each picture. The individual images of at least one of the image contents can be transmitted to at least one of the at least one viewer.

DESCRIPTION OF THE DRAWINGS

The invention is to be explained below using a few examples. Shown are.

DETAILED DESCRIPTION OF PREFERRED EMBODIMENTS

Figure 1:
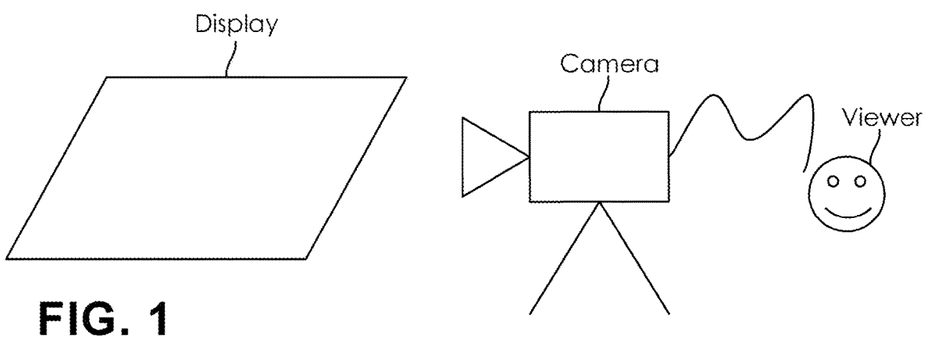
FIG. 1: an exemplary arrangement of a device for carrying out the method according to the invention.

FIG. 1 shows a device having a display 1 and a camera 2 with which a method according to the invention can be carried out. In this case, the display 1 can show at least two different image contents in each case through a plurality of individual images. The display shows the individual images periodically one after the other. Said display shows a plurality of individual images within a respective display period of at least one of the image contents and/or said display shows at least one of the image contents for longer than the other image content(s). The camera 2 outputs a plurality of pictures of a scenery that at least partially contains the display 1. A picture timing, which is a chronological sequence of the pictures output by the camera 2, is then synchronized with a individual image timing with which the display 1 shows the individual images, so that the camera 2 outputs at least one of the individual images shown by the display for each picture. The individual images of at least one of the image contents are transmitted to at least one of the at least one viewer 3.

The camera 2 can be a high-speed camera, for example, which is synchronized with the display 1 via the shutter, for example, such that only one image content is visible at the point in time of the exposure. The image content can be a video signal, for example.

The following convention shall be used in this document. Different image contents are named with different capital letters, that is, A, B, . . . . The image contents are shown uninterruptedly for certain durations, that is, not interrupted by other image contents, or shown in consecutive individual images. The time length of said durations is to be specified here in the time units ze, a time unit ze being defined as the duration of a display period divided by a number i which is greater than or equal to 2. The duration d of the consecutive display of image content should be indicated by the number of time units as a number followed by the capital letter designating the image content. The specification Bd therefore means that the image content B is specified consecutively or uninterruptedly for a duration of d ze. For example, B2 means that the image content B is given for 2 ze. The length of the display period depends on the refresh rate of the standard that is used. A refresh rate of 50 Hz is common in Europe, so that the duration of a period can advantageously be 20 ms. In this example, 1 ze=1 ms can be advantageous. In the nomenclature, an apostrophe means that a color correction of the corresponding content is shown. For example, A2' means that a color correction of image content A is presented for 2 ze. Two apostrophes mean that a luminance correction of the corresponding image content is shown. B4" thus means that the image content B is shown for 4 ze with a luminance correction.

Figure 2:
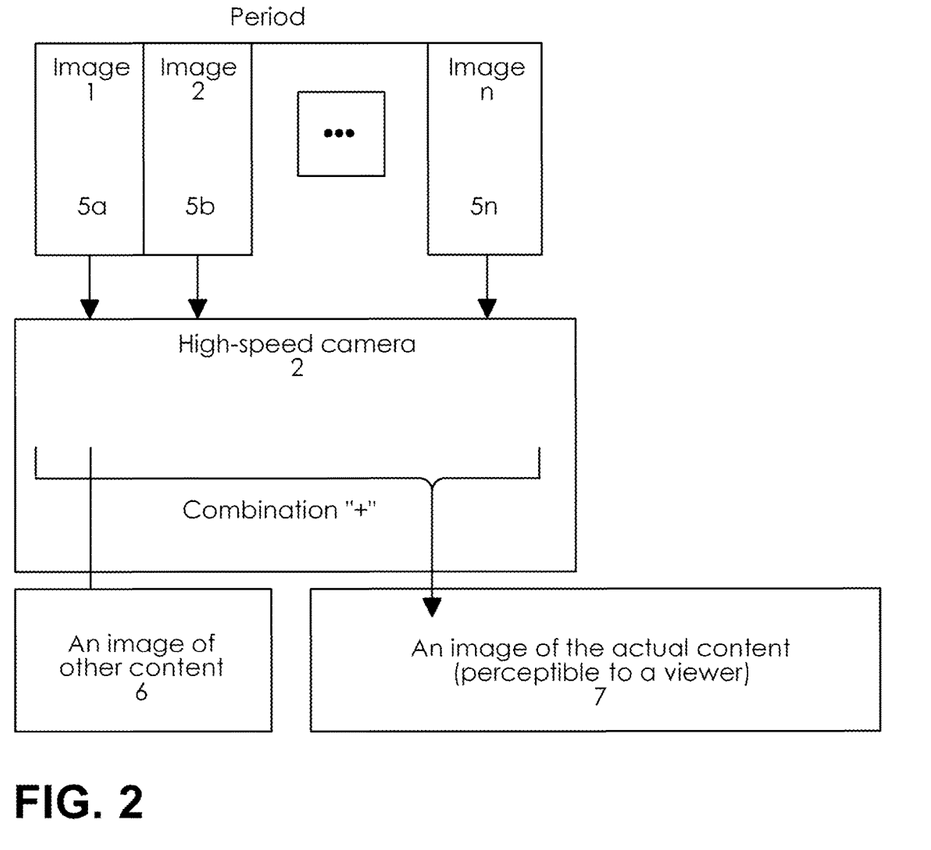
FIG. 2: a schematic representation of the basis of the method according to the invention.

FIG. 2 schematically shows an example of the method according to the invention. The display 1 shows a plurality of individual images 5a, 5b, ..., 5m within a period 4. The camera 2 outputs a plurality of pictures of a scenery that at least partially contains the display 1. In this case, the high-speed camera 2 can transmit one of the image contents 6 to a viewer 3. The camera 2 may, but need not, also output an image 7 that is visible to an immediate viewer of the display.

In the example shown, the camera 2 records image content A and all other image components shown within the display period 4. In this example, the combination of all image components of the high-speed camera 2 add up to the video content that can be perceived by an immediate viewer.

For example, by setting a shutter on a further camera, said camera can record image content B with images of longer shown content, or image content A with images of briefly shown image content. A high speed camera 2 can contain both at the same time. For example, the high-speed camera can be a slow-motion camera, and a normal recording camera can be a commercially available TV camera, for example.

The contents of the further recorded individual images are arbitrary in this case. They can be the same or different. The combination, for example, summation of all recorded sub-images of a presentation period, can then result in the video actually shown, which a viewer of the display can also perceive on site. One or more individual images of the pictures output by the camera 2 can therefore be used here, and the overall image of all images output by the camera 2.

If a high-speed camera also allows shutter settings (for example, 1 ze exposure every 2 ze, that is, 1 ms exposure phase and 1 ze blind phase), these can be used for contents with color compensation, for example. Likewise, individual image components recorded by the high-speed camera can contain the color compensation instead of regular video contents. Furthermore, content for one or more exposure phases and blind phases can be shown in an overlapping manner.

Since the contents of the further images recorded by a high-speed camera 2 are arbitrary, they can also be further differentiated. The method described can also be repeated within a period in any combination, for example, to differentiate further contents. However, the property is preferably preserved that the sum of all image contents of a period results in the actual content that can be perceived by the viewer.

Likewise, the first image content of a display period does not necessarily have to be used in order to show content other than that actually presented. It can be at any point in time recorded by the high-speed camera 2 as a individual image, such as in the middle or at the end of the period.

The shown content of an image of the high-speed camera is arbitrary. It preferably complements itself with all other contents shown in the period to form the actual content visible to the viewer. It can show content of interest to a viewer, the content being used without further image processing. In particular, it can contain one or more specific colors or patterns that can be recognized via image processing. The patterns may oscillate over the sequence of images of the one content or all contents, so the image processing may include recognition over the time sequence of the images.

In the idea presented here, two (or more) video contents (image contents) can be presented on one display such that a camera shutter set for a short time only sees the frames of the one video and a shutter set for the full frame period sees the other video. A high-speed camera 2 can record a plurality of individual images in the frame period, of which one individual image (or a plurality of individual images in the case of more than one "hidden video") can show the frames of the briefly presented video, other individual images of any other content which as a whole is assembled into the video presented in the full frame period. Here, a viewer of the display sees only the video presented in full frame period. As a direct benefit of this approach, the video consisting of the sum of all individual images has a motion blur equivalent to that recorded by any other camera having a long exposure time. Switching the video from different camera positions no longer changes the image perception. Simultaneously, from one camera position, one gets pictures with two (or more) contents on the display. The last sentence is intended to clarify again why the use of the slow-motion camera and the use of the overall image as a new idea in this application brings an improvement.

Since the display can be freely selected at the point in time of the further individual images and during the course of an exposure time, further improvements can be made during said period of time.

As described, the flicker effect occurs primarily in the lateral field of vision of the human eye, since there, with few receptors, one hardly perceives image resolution and mainly movement. The situation is exactly the opposite in the central field of vision. The predominant influence for the flicker effect is the image brightness and less the coloring of the image. This can be explained for the entire visual field from the comparatively lower number of color receptors compared to brightness receptors on the retina of the eye ("In the dark, all cats are gray."). Studies have shown that even a color change every 10 ms is imperceptible. Differences in brightness, on the other hand, are still perceptible, even if there is a jump in brightness in only 2 ms from 20 ms. If one wants to bring in other colors briefly within the display of each video frame (20 ze), it is sufficient to reduce the flicker effect by taking the differences in brightness of the contents into account.

The simplest way is to increase the frequency of the brightness presentation so that it is above human perception. For example, if the presentation of two video contents over the 20 ze display period was in the form A2+B18' (A2 means briefly shown video A for 2 ze, B18' color-corrected video B with full frame period 20 ze, that is, B=(A2+B18'), the apostrophe stands for the color correction), then it can be changed in the following double sequence A2+(B8'+A2+B8') without the pictures of both video contents showing changes. Only the hue of the briefly shown video is intensified and has to be compensated for more in the color correction of the long-shown video. This poses a problem for photographers, however, since they expose at any point in time without synchronizing with the display. If the sequence is A2+(B8+A2'+B8), the color balance takes place in the second phase (A2') of the briefly shown video A and the content of the long-shown video B can remain unchanged in color.

As mentioned in the first section of this document, the properties of the high-speed camera used are not sufficiently taken into account. There are types of cameras that cannot issue single images and the overall image at the same time like a slow-motion camera, but which allow higher scanning frequencies and variable shutters. For such cameras, the display can initially be adapted in the form A2+A2'+B16. That is, the briefly shown video A is followed by its inverse for color correction. Video B, which has been displayed for a long time, is shown in the remaining time of a frame period. The shutter of the camera is operated asynchronously and adjusted accordingly to the first 2 ze and the last 16 ze of a frame period. The image sequence obtained is split (de-multiplexed) into two video streams. The benefit is that photographers are more likely to record color-correct content and motion blur is preserved for at least one of the two videos. There is a higher proportion of displays with different brightnesses if one assumes that video A has a different luminance than video B. To reduce the resulting flicker effect, the luminance can also be adjusted here in the form of frequency doubling. This can usefully be done during the time in which B16 is being shown, in which the content is specified as fixed. On the other hand, changing the luminance is enough to reduce the flicker effect. A possible remedy is the following division of the display: A2+A2'+ B6+B4"+B6 (the two apostrophes of B stand for a lowering of the luminance in video B to the level of video A).

The technical limits are reached due to the large amount of data when using high-resolution cameras. The currently available UHD camera from a manufacturer can currently only expose twice at the set TV frequency (here 50 Hz, as an example) with a shutter of the same length, for example, twice with 2 ze every 10 ze. In order to show two video contents here, both contents would have to be shown alternately for 2 ze every 10 ze (that is, A2+x'+B2+y', x and y of equal length). In order to expose one of the two videos as long as possible for other cameras and for photographers and thus to preserve the motion blur, x and y show parts of the one video B (that is, A2+[B8+B2]+A2'+B6 or A2+B6+A2'+ [B2+B8]). B8 and B2 show identical content. The exposure is made at the time of showing A2 and B2, respectively. Since A2 and A2' are closer together in time, the flicker effect is intensified. A remedy is to split a phase (A2') accordingly and achieve the reduction via a triple split flow (that is, A2+B7+A1'+B2+A1'+B7). Said sequence combines flicker reduction, color correct exposure of contents for photographers, and long exposure time for Video B to preserve motion blur.

Special properties of LED displays can be taken into account in a similar way. In Europe, production takes place at 50 Hz (20 ms per frame), the display of content on LED displays takes place without the approaches described here for fading in further contents, but is unsynchronized with the television clock at 60 Hz, since they are operated via standard computer monitor technology (transmission via DVI Standard). A briefly shown content can only be shown frame-synchronized for the camera once the display has been synchronized with the clock of the recording camera. However, it is not necessary here for the long-shown video content to also have to be synchronized. Rather, it is quite possible that it will continue to be shown at 60 Hz, while the briefly shown content will be faded in at a different frame rate synchronously with the recording camera. The approaches explained in this document remain independent of this and thus serve the same purpose.

For each briefly shown video, a motion blur, in particular for camera pans, can also be calculated retrospectively through the appropriate use of camera sensors in connection with image processing (or through pure image processing).

As mentioned in the first section, it is mainly the fluctuation in luminance that causes the flicker effect that can be perceived by the human eye. Colors, on the other hand, are hardly responsible for this. As already mentioned above, in the long display of a video B, the luminance can be temporarily adapted to the level of the briefly shown video A. As a result, the change in luminance across the 20 ze occurs at twice (or even faster) the frequency without degrading images for photographers or longer exposing cameras.

The interaction of luminance and the colors shown can bring further improvements. For this purpose, it is advantageous to consider the luminance effect of individual colors separately. A display of magenta in a briefly shown video A can be balanced with green (separately as with A2+A2'+B16 or in combination as with A2+B18') for color neutrality. Green/magenta have approximately the same luminance effect in the human eye. The situation is different with the combination of blue/yellow. The influence of blue on the luminance effect is very small (for example, only 10%) while that of yellow is close to white (100%). There are hardly any flicker effects for two videos A=Magenta and B=Green, and very strong flicker effects for videos A=Blue and B=Yellow. A compensation for A2=Blue in the form A2+B8+A2'+B8 can therefore only be made for A2' with dark yellow. This leaves a color distortion into blue. A complete color correction is then possible via a correction in phases B8. This gives a sequence of the form A2+B8'+A2'+ B8' with A2=Blue, A2'=Dark Yellow and B8'=Content B with a slight yellow tinge. Other combinations in which the content B is presented in the correct color for a long time (for example, A2+B7+B1'+A2'+B7+B1') are also possible. For video content A and B that do not show the colors mentioned over a large area in the image (for example, multicolored natural images), the overall effect of the luminance in an image or in a sub-area of the image can also be taken into account for correction. For example, a predominantly green image with few and small blue dots in video A and predominantly magenta content in video B will cause almost no flicker effects in the human eye. A separate correction of the dark blue is therefore not necessary.

What is claimed:

1. A method for transmitting at least one image content to at least one viewer, comprising:
   wherein at least two different image contents are each represented by a plurality of individual images,
   providing a display showing the plurality of individual images periodically one after the other, wherein the display shows a plurality of individual images of at least one of the image contents within a display period and/or showing at least one of the image contents longer than the other image content(s) within a display period,
   providing a camera outputting a plurality of pictures of a scenery that at least partially contains the display,
   providing a picture timing, which is a chronological sequence of the pictures output by the camera, being synchronized with an individual image timing with which the display shows the individual images, so that the camera outputs at least one of the individual images shown by the display for each picture,
wherein the individual images of at least one of the image contents are transmitted to at least one of the at least one viewer,
wherein the individual images output by the camera that belong to the same image content are added up and/or interpolated according to content or intensity.

2. The method according to claim 1, wherein the camera outputs all of the individual images shown by the display.

3. The method according to claim 1, wherein the picture timing is synchronized with the individual image timing such that the camera outputs exactly one of the individual images shown by the display for each picture.

4. The method according to claim 1, wherein the individual images shown by the display are designed such that an immediate viewer of the display perceives exactly one of the image contents and/or that the individual images shown by the display add up to exactly one image content perceived by an immediate viewer of the display.

5. The method according to claim 1, wherein a first of the image contents comprises a color correction of a second of the image contents, the color correction being designed such that an immediate viewer of the display perceives the first image content without a color change compared to the original first image content, wherein the color correction is thereby added to the first image content, that an inverse of the individual images of the second image content in the corresponding display period, which is pixel by pixel, is added to the individual images of the first image content in said period.

6. The method according to claim 1, wherein the individual images shown by the display per display period can firstly contain first individual images that represent a first image content, secondly contain second individual images that represent a second image content and thirdly contain third individual images that cause color compensation of the second individual images for a direct viewer of the display.

7. The method according to claim 1, wherein the display shows the third individual images divided into at least two groups, wherein the at least two groups are spaced apart by at least one or more of the first and/or second individual images.

8. The method according to claim 1, wherein
the display within each display period initially, for a duration t151 wherein t151=2 ze, where the unit ze is defined as the duration of the display period divided by a number i, i>=2, shows a first of the image contents, and then for a duration which is equal to the duration of the display period minus t151, shows a second of the image contents which is color corrected to compensate for the first of the image contents,
wherein the display shows, within each display period, initially for 2 ze at least one individual image of the first image content, then for 8 ze at least one individual image of the second image content, then for 2 ze at least one individual image of an inverse of the first image content and then for 8 ze at least one individual image of the second image content.

9. The method according to claim 1,
wherein the display within each display period initially, for a duration t181 wherein t181=2 ze, where the unit ze is defined as the duration of the display period divided by a number i, i>=2, shows individual images of a first of the image contents, then shows individual images of an inverse of the first of the image contents for a duration t181, and then for the remainder of the display period 16 ze, shows individual images of a second of the image contents, wherein the picture timing of the camera is synchronized with the individual image timing such that the camera outputs the first individual images of the first of the image contents and the individual images of the second of the image contents, but not the individual images of the inverse of the first of the image contents.

10. The method according to claim 1,
wherein the display within each period initially, fora duration t191, wherein t191=2 ze, where the unit ze is defined as the duration of the display period divided by a number i, i>=2, shows individual images of a first of the image contents, then shows individual images of an inverse of the first of the image contents for a duration t191, then for a duration t192 wherein t192=6 ze, shows individual images of a second of the image contents, then for a duration t193 wherein t193=4 ze, shows individual images of the second of the image contents, the common luminance of which is adjusted to the common luminance of the individual images of the first of the image contents, and then shows individual images of the second of the image contents for a duration t192.

11. The method according claim 1, wherein the display within each period initially, for a duration t111, wherein t111=2 ze, where the unit ze is defined as the duration of the display period divided by a number i, i>=2, shows individual images of a first of the image contents, then for a duration t111, shows individual images of an inverse of the first of the image contents, then for a duration t112 wherein t112=4 ze, shows individual images of a second of the image contents, then for a duration t113, wherein t113=2 ze, shows individual images of the second image content, the luminance of which is adjusted, then for a duration t112, shows individual images of the second image content, then again shows individual images of the second image content fora duration t113, the luminance of which is adjusted, and then shows individual images of the second image content again for a duration t112, wherein the luminance of the individual images of the second image content is adjusted such that the luminance of all individual images, the luminance of which is adjusted, is equal to a common luminance of the individual images of the first image content,
wherein the camera precisely outputs the individual images of the first image content shown during the first duration t111 and the individual images of the second image content shown during the second occurrence of the duration t112.

12. The method according to claim 11,
wherein the picture timing is synchronized with the individual image timing such that the camera outputs the first individual image(s) of the first image contents or a part or all of the individual images of the second image contents, but not the individual images of the inverse of the first image contents and not the individual images of the second of the image contents with adapted luminance.

13. The method according to claim 1,
wherein the display shows a first of the image contents and a second of the image contents for a duration t201, wherein t201=2 ze, where the unit ze is defined as the duration of the display period divided by a number i, i>=2, alternating separated by a time interval t202, wherein t202=10 ze, from each other, wherein the picture timing of the camera is synchronized with the display timing so that the camera outputs pictures of durations t201 but not pictures of time intervals t202.

14. The method according to claim 13, wherein the display shows individual images of the first and/or the second image contents during the time intervals t202.

15. The method according to claim 14, wherein the display shows at least two individual images during the time intervals t202, the individual images containing an inverse of at least one image content shown during the durations t201, wherein at least one individual image of a different image content is shown between said individual images.

16. The method according to claim 1, wherein the display shows the image contents in the following order during a display period:
a first A of the image contents for a duration t201,
a second B of the image contents for a duration t202,
an inverse A' of the image content A for a duration t201/2,
the second B of the image contents for a duration t203,
the inverse A' of the image content A for a duration t201/2, and
the second B of the image contents for a duration t202,
wherein preferably t201=2 ze, t202=7 ze, t203=2 ze, where the unit ze is defined as the duration of the display period divided by a number i, i>=2.

17. The method according to claim 1, wherein all individual images output by the camera are transmitted to the viewer and shown thereto.

18. The method according to claim 1, wherein the individual images of different image contents output by the camera are transmitted to different viewers.

19. The method according to claim 1, wherein a further camera outputs only part of the individual images shown per display period, wherein said part of the individual images presents precisely one of the image contents.

20. The method according to claim 1, wherein at least one of the image contents comprises a pattern and an inverse of the pattern, wherein the pattern and the inverse of the pattern are shown alternately, in consecutive display periods, wherein said image content is transmitted to a recognition device which, on the basis of said image content, recognizes the display in the scenery recorded by the camera and distinguishes the display from areas which are not the display.

21. The method according to claim 1, wherein a plurality of individual images of different image contents are presented alternately within a respective display period.

22. The method according to claim 1, wherein the display shows a plurality of identical individual images within a respective display period of at least one of the image contents.

23. The method according to claim 1, wherein the image contents are sent to the display at a first frame rate, which differs from a display frequency of the display and wherein a recording frequency of the camera is equal to the first frame rate.

24. The method according to claim 1, wherein a display period contains more individual images of one of the image contents than individual images of another of the image contents.

25. The method according to claim 1, wherein the picture timing of the camera is periodic with a period duration equal to a period duration of a period of the individual image timing of the display.

26. The method according to claim 1, wherein a common luminance of the individual images of the first image content is equal to a common luminance of the individual images of the second image content.

27. The method according to claim 1, wherein the individual images comprise a plurality of sub-areas, wherein a common luminance of corresponding sub-areas of the individual images of the first image content is equal to a common luminance of corresponding sub-areas of the individual images of the second image content.

28. The method according to claim 27, wherein different colors contribute, according to their brightness values, to the common luminance of the corresponding sub-areas.

29. The method according to claim 1, wherein the camera can output up to 100, or up to 120, or up to 150, or up to 300, or up to 400, or up to 800, or up to 960 pictures per second.

30. A device for transmitting at least one image content to at least one viewer, comprising:
at least one display with which a plurality of individual images can be shown periodically one after the other, the display being able to present a plurality of individual images within one display period of at least one of the image contents,
a camera with which a plurality of pictures of a scenery that at least partially contains the display can be output,
a picture timing, which is a chronological sequence of the pictures output by the camera, being synchronized with a individual image timing, with which the individual images can be shown by the display, such that the camera outputs at least one individual image shown by the display for each picture,
the individual images of at least one of the image contents being able to be transmitted to at least one of the at least one viewer,
a method according to claim 1 being able to be carried out using the device.

\* \* \* \* \*